Figure 1:
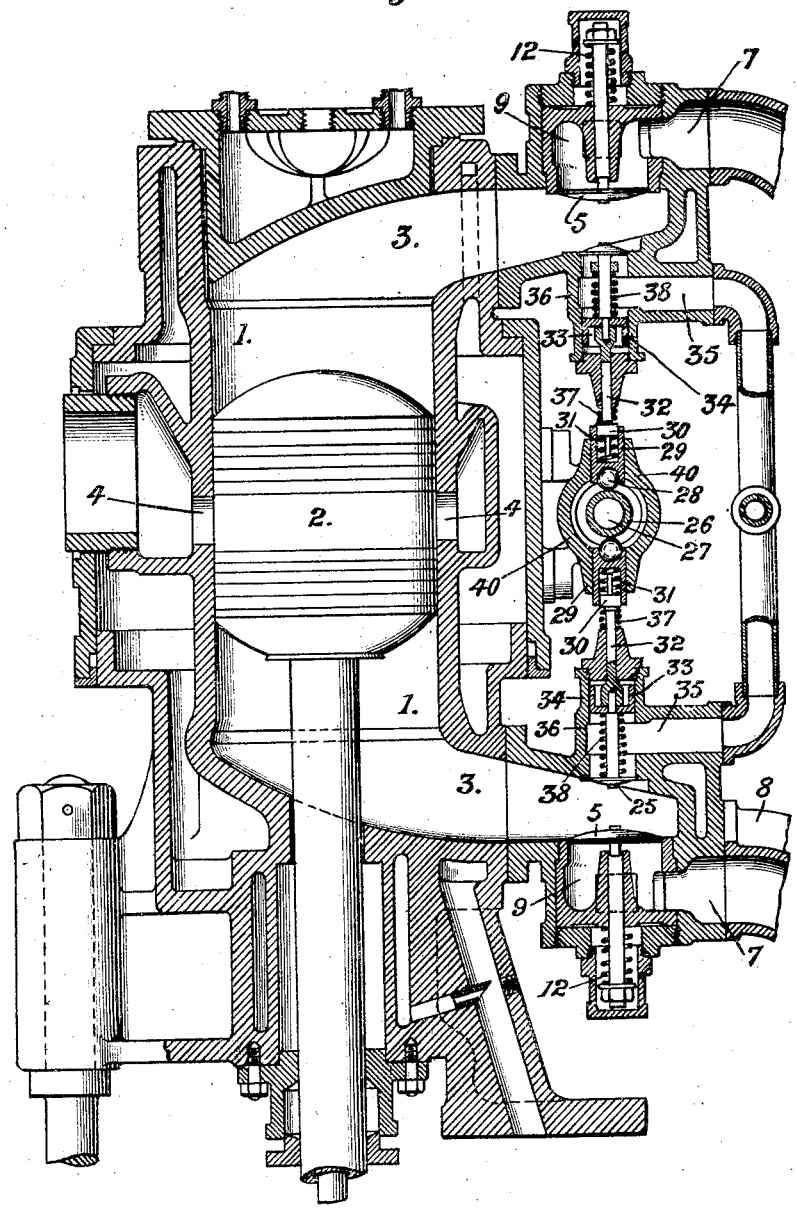

No. 867,777. PATENTED OCT. 8, 1907.
C. H. T. ALSTON.
INTERNAL COMBUSTION ENGINE.
APPLICATION FILED JUNE 28, 1907.

3 SHEETS—SHEET 1.

WITNESSES
W. P. Burk
John G. Percival

INVENTOR
Charles Henry Thomas Alston
By M Wallace Alut
ATT'Y

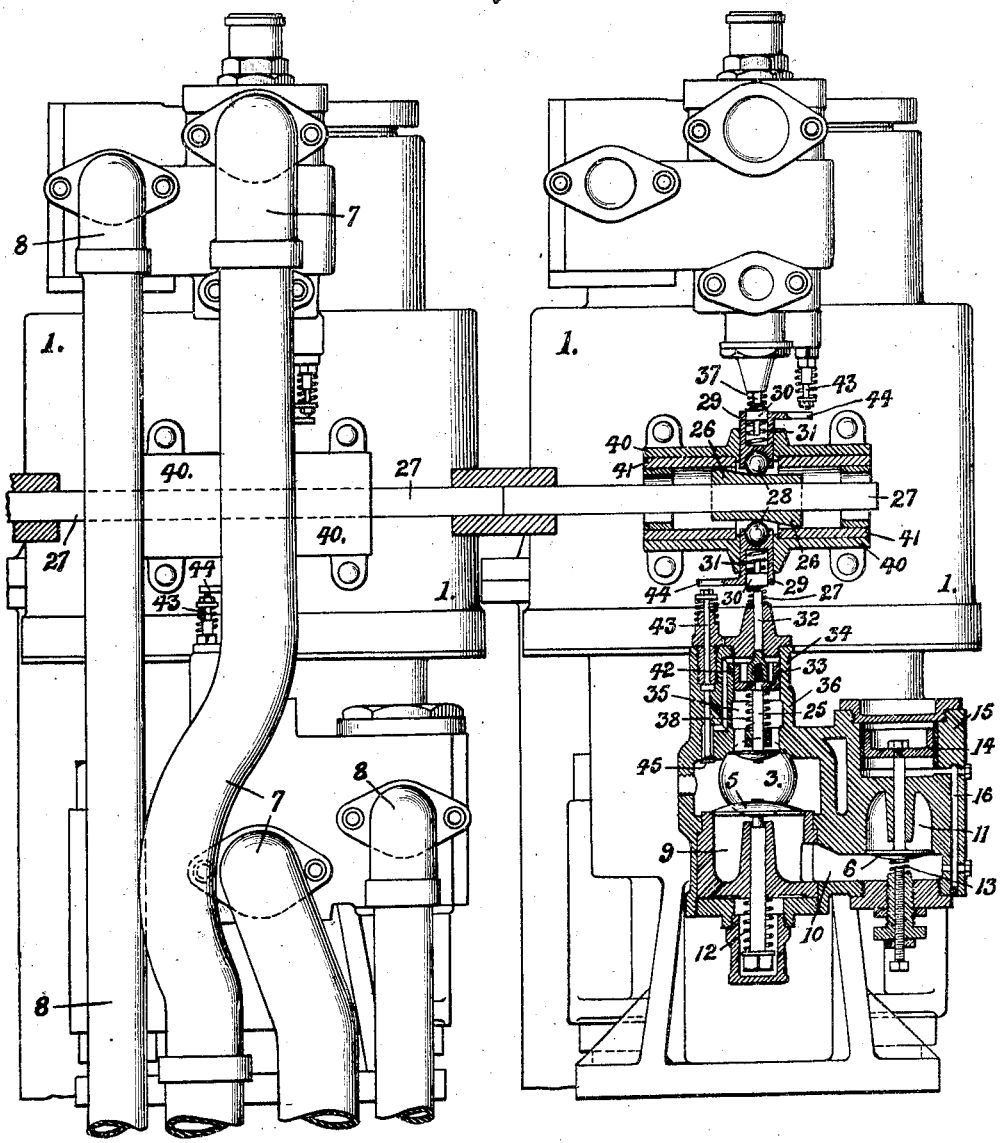

No. 867,777. PATENTED OCT. 8, 1907.
C. H. T. ALSTON.
INTERNAL COMBUSTION ENGINE.
APPLICATION FILED JUNE 28, 1907.
3 SHEETS—SHEET 3.
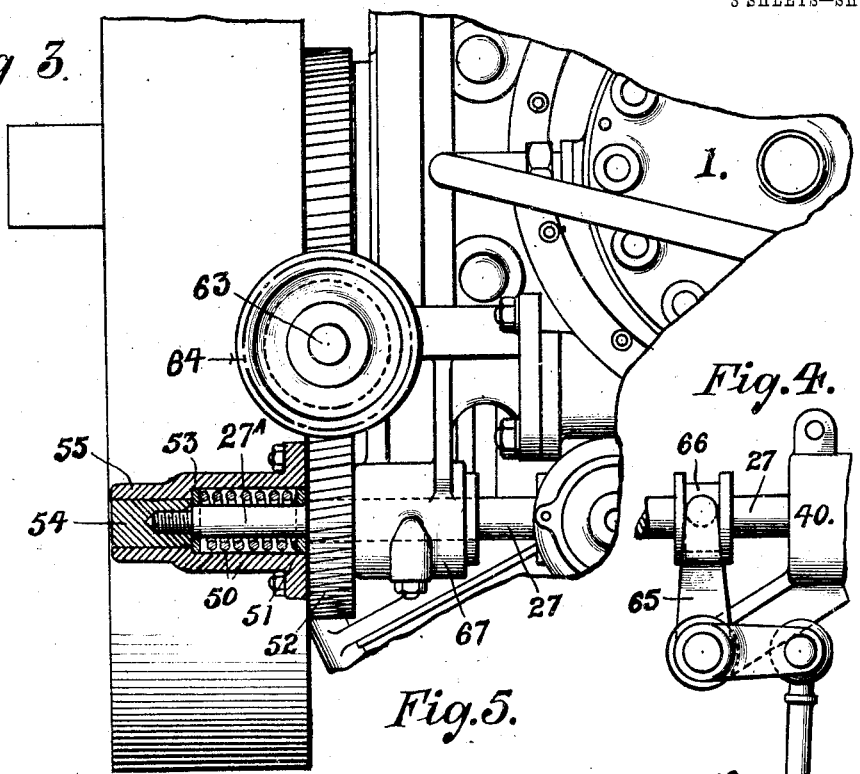
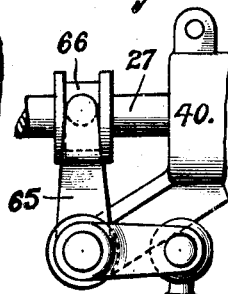
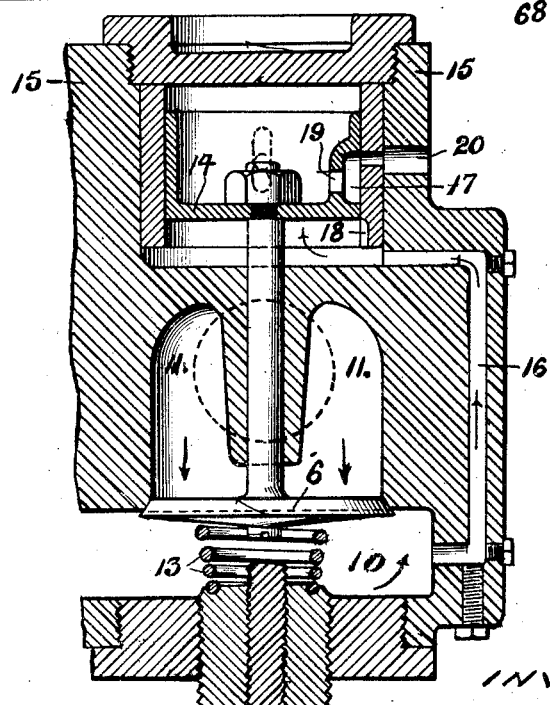
WITNESSES
W. P. Burke
John A. Percival
INVENTOR
Charles Henry Thomas Alston

UNITED STATES PATENT OFFICE.

CHARLES HENRY THOMAS ALSTON, OF LONDON, ENGLAND.

INTERNAL-COMBUSTION ENGINE.

No. 867,777.  Specification of Letters Patent.  Patented Oct. 8, 1907.

Application filed June 28, 1907. Serial No. 381,323.

*To all whom it may concern:*

Be it known that I, CHARLES HENRY THOMAS ALSTON, a subject of the King of England, residing in the city and county of London, England, have invented new and useful Improvements in or Connected with Internal-Combustion-Engines, of which the following is a specification.

This invention has reference to internal combustion engines, and primarily to engines of that type employing air and gas, or air and oil or spirit vapor as the combustible fluid, which are reversible and self-starting, and capable of being easily maneuvered; and it has for its objects and effects, among others, to provide improvements as hereinafter described, by which the reversal and control of the engine shall be accomplished with ease and certainty; and the various functions to be performed in an engine of this kind shall be advantageously accomplished, and the power and action of the engine and its parts controlled simply, with ease, and with economy; while the engine itself shall be simple. In connection with this engine, when the piston reaches the end of its stroke, and the products of combustion have been exhausted, say, by the piston passing exhaust ports in the cylinder, a charge of scavenging air is first forced into the cylinder by an air pump, which sweeps out in front of it the remaining products of combustion. Then, subsequently to this, air and combustible fluid are forced into the cylinder, that is, into the air already contained in it, at the upper part of same; which, in turn, presses forward the air already delivered, towards the piston; part of this air escaping through the then open exhaust port. The piston returns, closing the ports and compresses the contents of the cylinder to the required degree, ignition takes place, and the piston is pressed outwards.

The invention will be described with the aid of the accompanying drawings which illustrate it; the novel characteristics being set out in the claiming clauses concluding the specification.

In the drawings, Figure 1 is a vertical section showing one cylinder and valve gear; and Fig. 2 is a back elevation showing two cylinders and valve gear, partly in section. Fig. 3 is a detail of the cam shaft and parts thereon connected with the mechanism for starting and reversing; and Fig. 4 is another detail of same; while Fig. 5 is a detail of the gas or mixture delivery valve piston.

In the drawings, 1 are the cylinders; 2 the piston; 3 the combustion chambers; 4 the exhaust ports; 5 the air inlet valves; and 6 the combustible mixture or gas— as the case may be—inlet valves.

The air for expelling the products of combustion from the cylinders after release, and the combustible fluid, are supplied by suitable pumps, which, in each stroke, deliver same to each end of the cylinder.

Separate valves 5 and 6 are used in connection with each combustion chamber 3; and the fluids are supplied to them from the pumps by pipes 7 and 8, respectively.

Each of the air valves 5—into the cases 9 of which the air from the air pumps enters direct—also serves to control the inlet of the gas or gaseous mixture, which is delivered past the valve 6 into the chamber 9 by way of the chamber 10; that is, the gas or gaseous mixture is pressed by its supply pump past the valve 6—which is opened by the pressure of same within its case 11—into this air valve case 9, and both the air, and the gas or gaseous mixture, are delivered past the valve 5. The valves 5 and 6 are pressed towards their seats by springs 12 and 13, respectively.

Each gas valve 6 has a piston 14 working in a small cylinder 15 above the valve, the area of the piston being slightly greater than the internal area of the valve 6 pressed upon by the gas or mixture; and the fluid in the chamber 10 is admitted to the underside of the piston 14 by a communicating passage 16, so that the valve 6 is normally pressed on to its seat by the pressure of the air or fluid in the chambers 9, 10, acting on the piston 14, and on the outside of the valve; and consequently, it does not open until the gas pressure in the space 11 behind the valve 6, is considerably greater, than that in the chamber 10. When however it is greater, then the valve is opened by this pressure, and the gas or mixture passes into the air chamber 9, and enters the cylinder, together with the air which is then entering, and being delivered from the air pump into the valve case 9.

The excess of pressure which opens the gas valve 6, is caused by the reduction of the pressure in the chambers 9 and 10 due to the escape of the air—constituting the scavenging air—to and through the cylinder and exhaust ports 4, which are uncovered at the end of the stroke of the piston 2. Consequently, by this arrangement, the desired automatic control of the supply of scavenging air, and the combustible fluid, and their delivery at the times and in the order required, is accomplished.

The controlling piston 14 and cylinder 15 connected with the gas or mixture valve 6, may have ports and grooves, so arranged that when the valve commences to open, it may (after say 3/32" movement) admit the air pressure behind the piston to equalize it, and so open quickly. This is shown in detail in Fig. 5, in which the port or groove in the piston is designated 17, which works in connection with a groove 18 in the cylinder wall; while a port-hole 19 is provided in the piston forming a communication between this port 17 and the inside of the cylinder 15. The metal below and at the end of the piston port 17 is about 3/32". Thus, when the inner edge of this metal is moved so as to come below the upper end of the groove 18, when the valve 6 is opening, the air under the piston can flow by way of the port 17 and the opening 19 to the upper side of the piston, so that the pressure under the piston, tending to prevent the opening of the valve, is removed, the piston being then in equilibrium. And when the piston has moved this extent, simultaneously with the opening just referred to, the metal at the upper end of the port 17 closes the port 20 in the cylinder wall and its liner, and prevents the air escaping through this port or hole; but as soon as the valve 6 closes to the extent that communication between the groove 18 and the port 17 is cut off, this port or passage 20 is opened, and so the pressure of air on the upper side of the piston is relieved, the air escaping by way of the hole 19 and ports 17 and 20.

In the operation of the engine, by this method described of introducing the air, and the gas or mixture, and by the arrangement of valve specified, when the piston 2 uncovers the central exhaust port 4, and the pressure in the cylinder drops to below that of the air supplied by the air pump, and existing in the case 9 of the inlet valve 5, so as to overcome the spring 12, this air will open the valve 5 and sweep the combustion chamber 3, and sweep out the products of combustion in this chamber and the cylinder through the exhaust ports 4, so that the cylinder will become filled with air, and until the pressure of this air in the valve case 9 and chamber 10, acting on the underside of the piston 14 of the valve 6, and upon the outside of the valve (as well as that due to the spring 13), has dropped to a certain and the required degree, the valve 6 will be kept on its seat, as this pressure will be greater than the pressure existing within the valve chamber 11 on the inside of the valve 6; but when the pressure of air falls as described, the pressure from the underside of the valve piston 14 also falls, and the pressure of gas or gaseous mixture pressing on the inside of the valve 6, will press it open, and the combustible fluid flows with the latter portion of the charge of air into the combustion chamber 3, and mixes with same; and the mixture will fill the combustion namber, or the upper portion of the combustion chamber. Hence, whether the charge of gas or gaseous mixture be a full charge, or any less than the full charge, its entrance into the cylinder is always automatically governed by the pressure of the air which precedes it, and its entry into the cylinder will always take place at the right time and in the order required.

The pressure of the gas or gaseous mixture acting on the valve 6 will of course depend upon the quantity supplied or forced by the pump into its containing chamber and pipe 8; and this quantity may be governed by a suitable governor, which will be adapted, in the usual way, to regulate the quantity of gas or mixture admitted by a throttle or regulating valve.

For starting the engine by compressed air or other gaseous fluid, lift valves 25—which are conveniently disposed in line with the main lift valves 5—are provided in, and deliver compressed air into the chambers 3; and they are worked by double barrel-cams 26, fixed on a rotary horizontal shaft 27, and rotated with it; and they are adapted to operate these valves through hollow slides 29—provided with a bearing ball 28—and plungers 30, fitting and adapted to work in the inside of the slides 29, a spring 31 being provided between the plungers, and the upper end of the slides. The plungers act on the end of a valve spindle 32 having a piston 33 on it, and working in a cylinder 34 at the outer end of the passage or chamber 35, by which the compressed air is supplied to the case 36 of the valve.

The rod 32 is normally out of contact with the underside of the plunger 30, there being a substantial amount of clearance; and the plunger is kept off it by a spring 37; while the piston 33 is normally pressed out by a spring 38, as well as by the pressure of the compressed air of the valve inlet chamber 35.

The cams 26, in their central position—the position shown in Fig. 2—have a neutral part, that is, they are practically cylindrical at this part; and on either side of this central part, cam or eccentric portions are provided; these portions gradually inclining from the central concentric neutral portion towards the parts of the maximum projection.

The slides 29 are carried in cylindrical cases 40 secured onto the outside of the cylinders; and the rotating shaft 27 is moved longitudinally either in the one direction or the other, according to which direction the engine is required to revolve, as hereafter described, so as to bring either the one cam portion at one end of the cams 26, or that at the other, into the active position, that is, in the vertical plane of the slides 29; or it is moved so as to bring the central or neutral portion into this plane, where the slides 29 will not be moved. The means of bringing the cams into this central or neutral position after they have been positively moved from the central or neutral position in either direction, so as to actuate and open the air valves 25 as hereafter described, is shown in Fig. 3. It comprises a spring 50 on the end of the shaft 27, in which power is stored when the starting lever or mechanism has been moved in starting the engine by compressed air; and the power of the spring acts longitudinally on this shaft in either direction in such a manner as to bring the cams 26 to the central or neutral position, after the starting lever has been brought back to the "running" position.

In one direction the spring 50 acts on the shaft 27 by pressing on a collar 51 resting on a shoulder on the shaft 27, formed by the part 27ª of the shaft being of reduced diameter; and this collar rests, when the shaft is in the central position, on the face of the spiral toothed driving wheel 52, which revolves this shaft by a key or the like, and through which the shaft 27 can slide; while in the other direction, the spring acts upon a collar 53, similar to 51, held in position by a nut 54 screwed onto the end of the shaft portion 27ª, and resting also, when the shaft is in the central position, on the inner end of the cylindrical casing 55, fixed on and revolving with the wheel 52. Hence, when the shaft 27 is moved one way longitudinally by the starting or reversing gear hereafter described, say, to the left, the collar 51 compresses the spring 59, it being moved away from the face of the wheel 52, along the cylinder 55 over the shaft part 27ª by the shoulder on the end of the shaft 27; and, conversely, when the shaft 27 is relieved, and free upon moving back the starting gear, the reaction of the spring pressing on the collar 51 presses the shaft 27 longitudinally, until the collar 51 again rests on the wheel 52, when the shaft and cams will be in the neutral position. Then, when the shaft 27 has been moved in the opposite direction longitudinally, namely, to the right, the nut 54 will move the collar 53 in the cylinder 55 and compress the spring; and when the shaft 27 is again freed after the starting action, this spring pressing upon the collar 53, forces the shaft back again to the central position, until the collar 53 again rests on the inner shoulder of the cylinder 55.

Each valve 25 is practically balanced by the balancing piston 33, so that it only requires a small amount of pressure to open it.

The springs 31, through which the motion given to the slides 29 by the cams 26 is transmitted to the plungers 30, and so to the valve stems 32, are stiff; that is, of such strength that normally, when the cams act upon the balls 28 and slides 29, the valves 25 will be opened, the amount of compression of the springs being practically nil; but in order to allow the valves 25 to close in case an ignition of a charge takes place while they are open, when starting the engine, the springs cannot resist the force and pressure created, so that, if then open, the valves can close by compressing the spring. Nor can the valves 25 open if the engine is firing, as the ignition is so arranged as to give a slight lead over the opening of the air valves 25, and the pressure due to combustion prevents them.

When the engine has started, and the starting means, say a lever mechanism of any suitable known kind is moved back from the starting position, the cams 26 are brought back to their neutral or central position as described, and the cam-operated gear is put out of action and remains inoperative.

To enable the air valves 25 to be lifted easily, so as to assist in the opening of these valves 25 when the cam shaft 27 and cams 26 are moved longitudinally, and it is desired to render them operative upon the valve actuating mechanism, should the compression pressure in the cylinder offer serious resistance to the opening of the valves, a small auxiliary compressed air relief valve 45 is provided in connection with them, which controls passage 42 forming communication between the outer side of the piston 33 and the combustion chamber 3; this valve being adapted to open this communication slightly before the valve stem 32 (which is connected with the piston 33) is acted upon by the plunger 30, by arranging the outer end of the spindle 43 of this valve 45 to be in constant contact with the projection 44 on the end of the slide 29; while a considerable clearance space normally exists between the plunger 30 and the rods 32, so that the rod 43 is acted upon before the rod 32. When this valve 45 is therefore opened, the compression pressure acting on the outer side of the piston 33 will tend to force it down and open the valve 25. Hence, when this shaft 27 is moved longitudinally by hand, in starting, the starting air valves 25 can be easily opened.

The longitudinal movement of the shaft 27 (whose rotation is effected from say the main crank shaft, by spiral toothed gear wheels 64 and 52—see Fig. 3) is produced by a bell-crank lever 65—see Fig. 4—actuated by any suitable means, and operating upon a grooved collar 66 on the shaft 27, disposed between one of the cam cylindrical cases 40 and the bearing 67, carrying one end of the shaft 27.

What is claimed is:—

1. In an internal combustion engine, a working cylinder and piston, an air pipe adapted to force air into the cylinder prior to the combustible fluid; a combustible fluid delivery pipe; an automatic lift valve 6 a valve case 11 therefor, said valve 6 being in communication with the cylinder and with the combustible fluid supply pipe and the air supply pipe, adapted to be kept closed by the pressure of said air while at or near its initial pressure, and also pressed in the opening direction by the pressure of said combustible fluid, and adapted to be opened by the pressure thereof when the counter-pressure of said air has been reduced by its release into the said cylinder by the exhaust of products of combustion; a non-return valve 5 and casing 9, having its outer area in communication with said valve case 11; a piston 14 connected with valve 6, a piston cylinder 15 for said piston 14; and means for connecting the cylinder 15 on one side of the piston with the space on the discharge side of valve 6, whereby said combustible fluid valve 6 is pressed towards its seat by said pressure acting on the piston prior to release of such pressure, and is relieved of same on release of such pressure; substantially as described.

2. In an internal combustion engine, the combination of a cylinder; an air pipe; a combustible fluid pipe; a non-return lift valve 5 controlling communication between said cylinder and said air and combustible fluid pipes; a non-return lift valve 6, the space in the discharge side of the casing of which is in communication with the inlet space and side of the said non-return valve 5, and the space at the other side of said valve 6 is in communication with the said combustible fluid pipe; a cylinder 15 and piston 14 adapted to work therein, and connected directly with said valve 6; and a passage 16 communicating with the space and chamber between the valves 6 and 5, and with the end of the said cylinder 15 nearest the valve 6; substantially as described.

In testimony whereof I have signed my name to this specification in the presence of two subscribing witnesses.

CHARLES HENRY THOMAS ALSTON.

Witnesses:
SOMERVILLE GOODALL,
WALTER MONTAGU HARRISON.